Feb. 14, 1939.
H. L. BERNARDE
2,147,423
REMOTE METERING SYSTEM
Original Filed Jan. 5, 1934
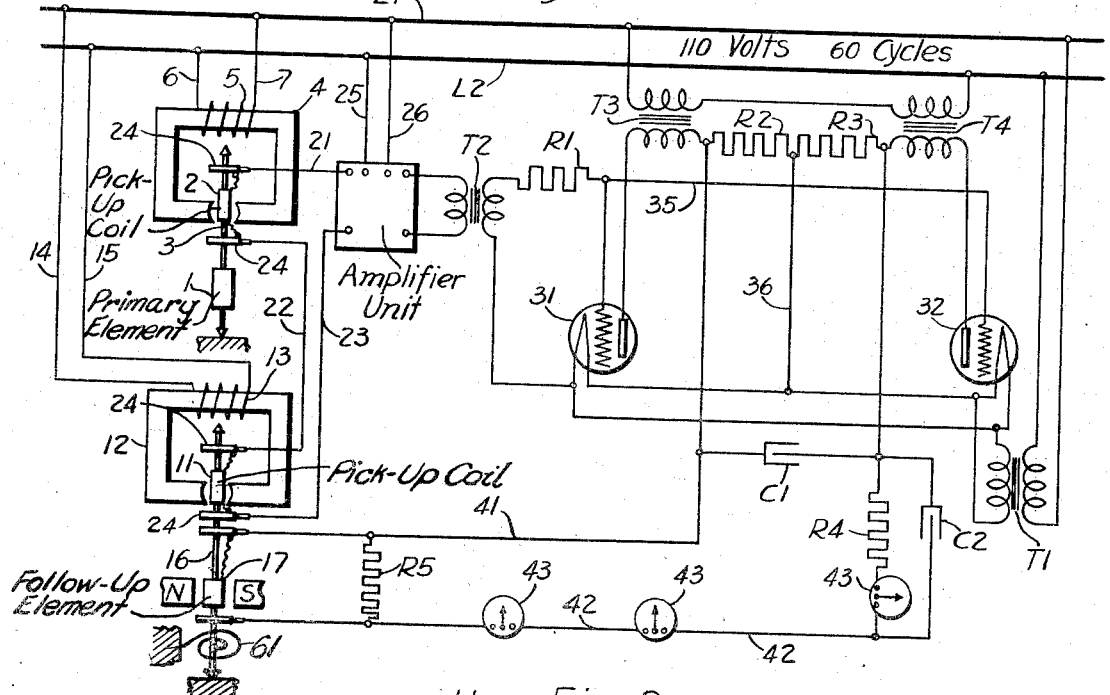
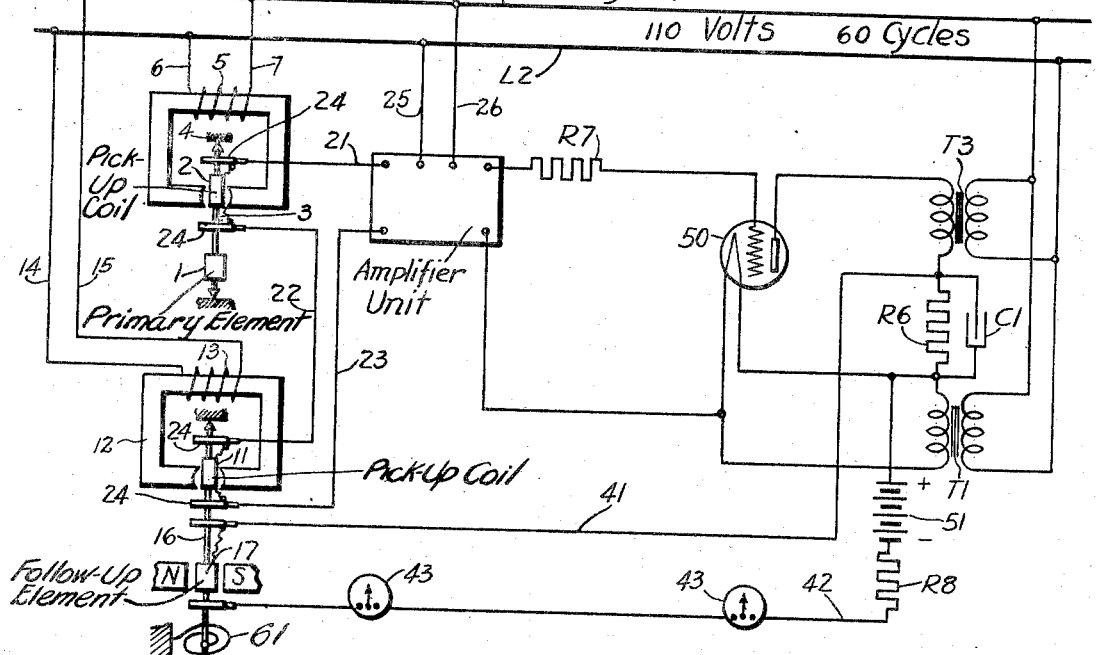
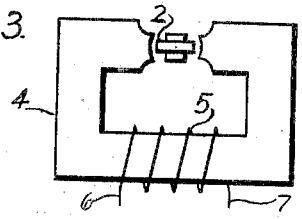
WITNESSES:
Michael Stark
Geo. O. Harrison
INVENTOR
Henry L. Bernarde.
BY
ATTORNEY Patented Feb. 14, 1939

2,147,423

UNITED STATES PATENT OFFICE 2,147,423

REMOTE METERING SYSTEM

Henry L. Bernarde, Kearny, N. J., assignor to Westinghouse Electric & Manufacturing Company, East Pittsburgh, Pa., a corporation of Pennsylvania Original application January 5, 1934, Serial No. 705,471, now Patent No. 2,106,825, dated February 1, 1938. Divided and this application October 15, 1935, Serial No. 45,044

4 Claims. (Cl. 177—351)

My present application is a division of my application Serial No. 705,471, filed Jan. 5, 1934, Patent No. 2,106,825, dated Feb. 1, 1938 and assigned to the Westinghouse Electric & Manufacturing Company. In the above-mentioned application there is disclosed a remote metering system in which an electromagnetic counter-torque device is mechanically coupled to a primary measuring element and is arranged to produce a counter-torque tending to oppose the torque developed by the primary element. An electromagnetic pick-up coil is also mechanically coupled to the primary element and is arranged to produce an alternating voltage dependent in magnitude upon the angular deflection of the primary element from a predetermined position.

The alternating voltage produced by the pick-up coil is amplified, and a direct-current component of the amplified current is circulated through the remotely disposed instruments and through the counter-torque device. As pointed out in the above-mentioned application, such an arrangement produces high-speed response of the instruments and is substantially free from errors caused by variations of supply voltage or of vacuum tube characteristics.

The present application relates to the same general class of apparatus as the application mentioned above. However, instead of opposing the torque of the primary element by means of a counter-torque device, in the system of the present application, I provide a pair of electromagnetic pick-up devices, mechanically operated, respectively, by the primary element and by a torque device energized by the line current. The alternating voltages developed by the pick-up devices are opposed in the same circuit, and their difference is amplified, rectified and supplied to the remote instruments. In this way, the primary element is permitted free movement, so that high-speed, accurate remote indications may be secured from primary elements of minute mechanical power.

It is accordingly an object of my invention to provide a novel electronic remote metering system which will produce high-speed remote indications in response to primary forces or torques of small magnitude.

Other objects of my invention will become evident from the following detailed description taken in conjunction with the accompanying drawing, in which Figure 1 is a diagrammatic view of a remote metering system embodying my invention.

Fig. 2 is a diagrammatic view of a modification of the system shown in Fig. 1; and, Fig. 3 is an elevational view showing a pick-up coil and its associated magnetic structure.

Referring more specifically to Fig. 1 of the drawing, the apparatus comprises a primary or basic driving element 1 which is the movable element of any measuring instrument or gauge responsive to the quantity to be measured whether it be volts, power factor, temperature, pressure, or some other quantity. A pick-up coil 2 is rigidly connected with the primary measuring element 1 through a suitable mechanical connecting member such as a shaft 3. A field structure 4 which is positioned in closely coupled inductive relation with said pick-up coil 2, is continuously energized by a winding 5 directly connected by suitable conductors 6 and 7 to an alternating current service line comprising conductors L1 and L2.

A second pick-up coil 11 is mounted in inductive relation to a second field structure 12 continuously energized by a winding 13 connected by suitable conductors 14 and 15 to the alternating current service line conductors L1 and L2. The second pick-up coil 11 is similar to the first, and it is rigidly connected through a suitable shaft 16 to a restoring coil 17 comprising the movable member of an instrument such as a milliammeter of the D'Arsonval type, which instrument serves as a follow-up element, as will be hereinafter more fully explained. The usual spiral spring for resiliently opposing movement of the coil 17, is indicated at 61. The pick-up coils 2 and 11 are connected in series relation to the input terminals of a suitable amplifier unit by conductors 21, 22 and 23 which may be connected to the coils through flexible pigtail connectors or slip rings 24 in a well known manner. The amplifier may be a conventional unit and it is energized through conductors 25 and 26 directly from the line-conductors L1 and L2.

A pair of three element electronic discharge tubes 31 and 32 are provided, which are preferably of the type known to the trade as #56.

The filaments of the tubes are continuously energized from the main line conductors L1 and L2 through a suitable transformer T1.

The grids of both tubes are connected together through a suitable conductor 35, and they are simultaneously energized from the output terminals of the amplifier unit through a suitable coupling transformer T2 having one terminal of its secondary winding connected to the filaments of the tubes, and the other terminal connected to the grids through a resistor R1.

The plate circuit of the tube 31 extends through the secondary winding of a transformer T3, thence through a resistor R2 and by way of a conductor 36 to the filament circuit. The plate circuit of the other tube 32 extends through the secondary winding of another transformer T4, through a resistor R3, thence by way of the common connecting conductor 36 to the filament circuit. The primary windings of the two plate circuit transformers T3 and T4 are connected together to the main line conductors L1 and L2 for simultaneous energization therefrom, in such a manner that during a half cycle when the plate of either tube is positive the plate of the other tube is negative, and the transformer ratios are preferably selected to apply about 220 volts to the plates.

An output conductor is connected between the resistor and the transformer winding in the plate circuit of each tube. The pair of output conductors 41 and 42 thus connected constitute a remote control circuit which may be extended to the various remote stations where devices 43 are to be controlled in accordance with the movements of the basic element 1. The controlled devices may be simple direct current milliammeters of the D'Arsonval type and, as will be readily understood, the instruments must be provided with scales properly calibrated in terms of the quantity to be indicated. A resistor R4 is provided in series with the instruments 43 in the output circuit to suitably limit the current therein, and render the system substantially immune to errors caused by varying line resistance. A condenser C1 is preferably shunted across the output conductors 41 and 42, and an additional condenser C2 may also be connected in shunt with the series resistor R4, or it may be shunted around both the resistor R4 and one of the instruments 43, as shown.

The output circuit also includes the driving coil 17 of the milliammeter movement which is mechanically connected to the second pick-up coil 11. A resistor R5 may be connected in shunt with the restoring coil 17 to provide suitable damping and to shunt a portion of the control circuit current in accordance with the operating characteristics desired. Very desirable operating characteristics were obtained in the system disclosed by selecting resistors R1, R2, R3, R4 and R5 of 1 megohm; 16,500; 16,500; 50,000; and 11 ohms respectively and condensers C1 and C2 of one and one-half microfarads respectively. It will be apparent, however, that my invention is not in any way limited to the specific values of resistance, capacity, and voltage mentioned which are given merely by way of example. If the pole tips of the field structure adjacent the pick-up coil are so shaped that the flux is concentrated adjacent the coil, as indicated in Fig. 3, the sensitivity of the system is increased. It will be apparent that the amplifier unit may be omitted if the torque of the primary element 1 is high enough to actuate a large pick-up coil, but when the primary measuring element is a very sensitive and feeble device, it is important to provide a suitable amplifier.

The operation of my system will be considered assuming that the primary measuring element 1 is at a zero position. In this condition the pick-up coil 2 is at its corresponding zero position, as are also the second pick-up coil 11 and associated restoring coil 17. The alternating voltage impressed upon the input terminals of the amplifier is then zero, as also is the voltage on the grids of the output tubes 31 and 32. The direct current impulses in the plate circuits of the output tubes are then equal, and since they pass through the resistors R2 and R3 in opposite directions, the IR drops are equal and opposite, and in any cycle the average voltage impressed upon the output circuit conductors 41 and 42 is zero. The indicating instruments are, therefore, all at their zero positions.

If the primary measuring element 1 moves to measure a finite value of any quantity, it will turn the connected pick-up coil 2 to a predetermined position in its associated field structure, thereby applying a predetermined alternating voltage to the amplifier and thence to the grids of the output tubes 31 and 32. During each half-cycle when the grids become positive, the plate of one of the tubes is also charged positively. Assuming that the plate of the adjacent tube 31 is the one that is charged positively when the grids are positive, the average plate current of this tube will be increased. Conversely, the average plate current of the other tube 32 will be decreased since its grid becomes negative when its plate is positive.

With these conditions the IR drops over the plate resistors R2 and R3 are no longer equal and opposite, and a voltage is impressed across the output conductors 41 and 42 which is equal to the average difference thereof. A current will then flow in the output circuit which causes the instruments 43 and restoring coil 17 to deflect. As the coil 17 turns, it moves the second pick-up coil 11 in a proper direction to introduce an opposing alternating voltage in the input circuit, thereby tending to neutralize, or oppose, the effect of the alternating voltage applied by the first pick-up coil 2. The opposing alternating voltage introduced by the second coil 11 will not quite equal that supplied by the first coil 2, and a definite current will continue to flow in the output circuit which is just sufficient to hold the instruments 43 and the coils 17 and 11 in a new position corresponding to that assumed by the primary element 1. The difference of pick-up coil parallelism which maintains an effective alternating current voltage difference in the input circuit is very slight because this alternating current difference voltage is amplified about one thousand times by the amplifier unit, and the maximum error thus introduced is much less than one per cent.

The indicating instruments 43 are moved very rapidly in response to the initial movement of the basic driving element 1, and the actuating force is gradually diminished as the instruments and restoring coil 17 approach their final positions, thereby avoiding overshooting and hunting.

If the primary element 1 now moves in the reverse direction, the degree of unbalance of the tubes 31 and 32 will be diminished, the current in the output circuit will decrease, and the instruments will approach their zero position.

If the basic measuring element is one which measures in either direction from zero, the instruments 43 may be provided with corresponding scales as the system will actuate them in either direction from zero in accordance with the movements of the basic element. The operation in the reverse direction is similar except that the output tubes 31 and 32 are unbalanced in the reverse relation and current flows in the opposite direction in the output circuit 41, 42.

Not only is my remote metering system very simple and free from mechanically moving parts and contacts, but it is very readily adjustable for various operating conditions and by properly selecting or adjusting the elements utilized in the circuits such as the resistors, condensers, transformers and tubes, or the amplifier sensitivity, or the turns on the pick-up coils, almost all possible degrees of sensitivity, damping and other operating characteristics are readily obtainable. The system being inherently symmetrical, the response in either direction is equal. It will be readily understood that instead of using two separate three-element tubes 31 and 32, a single tube may be utilized which includes two anodes, a grid and a cathode in a single enclosure.

My remote metering system may be simplified by omitting one of the pairs of input tubes, and using a single output tube, as shown in Fig. 2, which is preferably of the type known to the trade as #210.

When using a single 210 type output tube 50, as shown in Fig. 2, it is preferable to utilize a series resistor R6 of about 10,000 ohms in the plate circuit, and a resistor R7 in the grid circuit of about 50,000 ohms, and a resistor R8 of about 10,000 ohms in the output circuit to the indicating instruments. In using a single output tube, as in Fig. 2, it is necessary to insert a source of direct current 51, represented as a battery, in the output circuit. The elements of the circuit are so selected that the polarity of the direct current source 51 is just equal and opposite to the average IR drop over the resistor R6 when the basic measuring element 1 is in its zero position, and the average current in the output circuit is then equal to zero.

When the primary element 1 turns in a predetermined direction from its zero position, the average plate current of the output tube is increased, thereby increasing the IR drop over the resistor R6. The average value of the IR drop is then greater than the voltage of the source 51 by a predetermined amount and the resulting current correspondingly deflects all the remotely spaced direct current indicating instruments 43 in the output circuit.

If the basic element 1 turns in the opposite direction from its zero position, the average plate current of the tube 50 is diminished, thereby decreasing the IR drop across resistor R6 and the direct current source 51 causes the indicating instruments 43 to deflect in the opposite direction. It will thus be apparent that the simplified remote metering system of Fig. 2 will also operate reversably in either direction from zero and it may be utilized to provide indications of measurements which are all on one side of a zero reference position or alternatively on either side thereof by providing correspondingly calibrated direct current instruments in the output circuit.

As shown, a driving coil 17, acting mechanically in opposition to the usual spiral spring 61, is also energized by the current in the output circuit to actuate a second pick-up coil 11 to introduce an opposing alternating current in the input circuit as above set forth with reference to Fig. 1, whereby the system does not cause the indicators 43 to overshoot and hunt, although the response is so rapid as to be practically instantaneous. The input arrangement utilized with this system may be in accordance with that shown in Fig. 1.

It will be apparent that I have provided a simple remote metering system which eliminates complicated moving mechanical parts of high inertia, contacts, motors and variable resistances, and which has high speed response with good stability, and freedom from errors caused by normal variations in control voltage, tube characteristics, and line resistance.

Although I have shown and described certain specific embodiments of my invention, I am fully aware that many modifications thereof are possible. My invention, therefore, is not to be restricted except insofar as is necessitated by the prior art and the spirit of the appended claims.

I claim as my invention:

1. In combination, a remotely disposed direct-current measuring means to be actuated in accordance with a variable quantity, a source of alternating current, a measuring device having an element movable in accordance with said variable quantity, means actuated by said element for deriving from said source a first alternating voltage variable in amplitude, electronic discharge means responsive to said first voltage for providing direct current to actuate said measuring means in accordance with the variations of said quantity, a direct-current motive element energized in accordance with the output of said discharge means, a variable output impedance device energized from said source and controlled by said motive element for deriving from said source a second alternating voltage dependent in amplitude upon the magnitude of said direct current, and means for applying said second alternating voltage in opposing follow-up relationship to said first alternating voltage.

2. In combination, remotely disposed direct-current measuring means to be actuated in accordance with a variable quantity, a source of alternating current, a measuring device having an element movable in accordance with said variable quantity, a variable output impedance device energized from said source and controlled by said element for deriving from said source a first alternating voltage variable in amplitude, electronic discharge means responsive to said first voltage for providing direct current to actuate said measuring means in accordance with the variations of said quantity, a direct-current motive element energized in accordance with the output of said discharge means, a variable output impedance device energized from said source and controlled by said motive element for deriving from said source a second alternating voltage dependent in amplitude upon the magnitude of said direct current, and means for applying said second alternating voltage in opposing follow-up relationship to said first alternating voltage.

3. In combination, a remotely disposed direct-current measuring means to be actuated in accordance with a variable quantity, a source of alternating current, a measuring device having an element movable in accordance with said variable quantity, a pick-up device having a magnet energized from said source and having a movable coil inductively positioned in the field of said magnet and controlled by said element for deriving from said source a first alternating voltage variable in amplitude, electronic discharge means responsive to said first voltage for providing direct current to actuate said measuring means in accordance with the variations of said quantity, a direct-current motive element energized in accordance with the output of said discharge means, a second pick-up device having a second magnet energized from said source and a second movable coil inductively positioned in the field of said second magnet and controlled by said motive element for deriving from said source a second alternating voltage dependent in amplitude upon the magnitude of said direct current, and means for applying said second alternating voltage in opposing follow-up relationship to said first alternating voltage.

4. In a remote metering system, a measuring device having an element movable in accordance with a variable quantity, remotely disposed electroresponsive measuring means, an energizing circuit therefor, electronic discharge means for controlling the energization of said circuit, a pick-up device having a magnet energized from said source and having a movable coil inductively positioned in the field of said magnet and controlled by said element for deriving from said source a first alternating voltage variable in amplitude, a motive element energized in accordance with the current in said energizing circuit, a second pick-up device having a second magnet energized from said source and having a second movable coil inductively positioned in the field of said second magnet and controlled by said motive element for deriving from said source a second alternating voltage dependent in amplitude upon the current in said energizing circuit, and means for applying said second alternating voltage in opposing follow-up relationship to said first alternating voltage.

HENRY L. BERNARDE.